(No Model.)
B. J. KELLY.
STRAIGHT WAY VALVE.
No. 281,081.
Patented July 10, 1883.
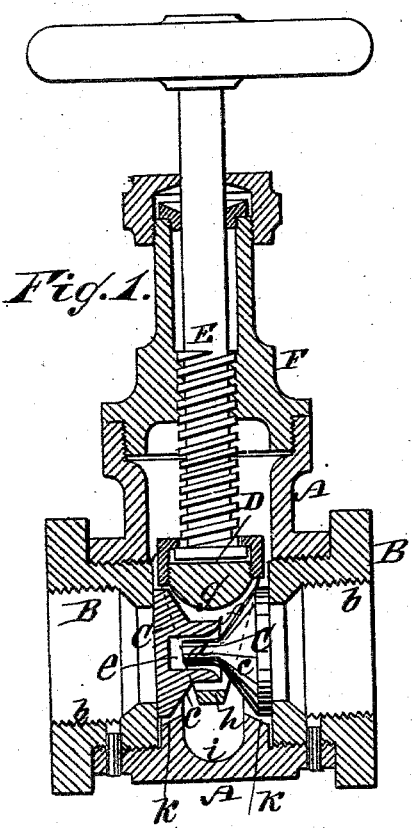
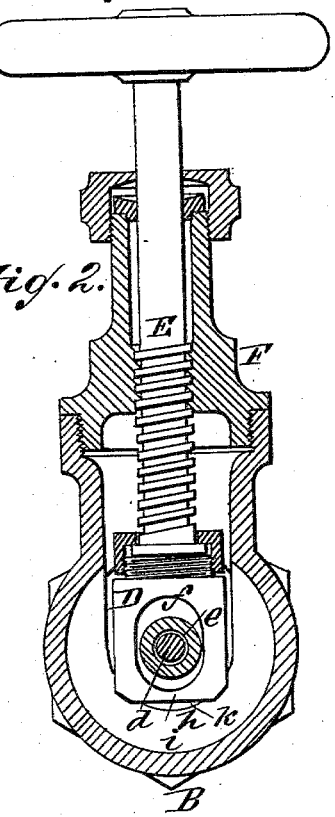
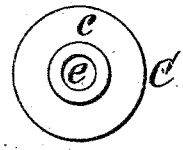
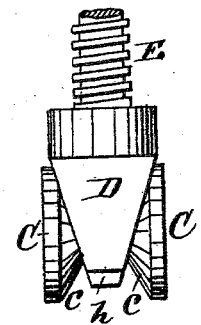
WITNESSES:
INVENTOR:
B. J. Kelly
BY Munn & Co
ATTORNEYS.

UNITED STATES PATENT OFFICE.

BARTHOLOMEW J. KELLY, OF TROY, NEW YORK.

STRAIGHT-WAY VALVE.

SPECIFICATION forming part of Letters Patent No. 281,081, dated July 10, 1883.

Application filed March 30, 1883. (No model.)

*To all whom it may concern:*

Be it known that I, BARTHOLOMEW J. KELLY, of Troy, in the county of Rensselaer and State of New York, have invented certain new and useful Improvements in Straight-Way Valves, of which the following is a full, clear, and exact description.

This invention relates to straight-way valves for controlling the passage of water, steam, and other gases or fluids, in which opposite gates or valve-disks capable of being raised or lowered and of being forced apart against their seats are used.

Reference is to be had to the accompanying drawings, forming part of this specification, in which similar letters of reference indicate corresponding parts in all the figures.

Figure 1 represents a mainly sectional, vertical, or longitudinal view of a straight-way valve embodying my invention; Fig. 2, a mainly-sectional view thereof in a plane or planes at right angles to Fig. 1; Fig. 3, a side view of a slotted wedge used to actuate the valvular devices or gates of the structure, also showing said gates or devices and the operating-stem, in part, connected with the slotted wedge. Figs. 4 and 5 are rear views of said gates or valvular devices.

A in the drawings indicates the body of the valve, fitted on opposite sides or ends, in direction of the course in which the current is designed to pass, with removable valve or gate seats B B, which may either be bolted to said body or be provided with external threads for screwing therein, as shown in the drawings, and which have also internal screw-threads, $b\ b$, for establishing connection with the inlet and outlet pipes that pass the fluid or gas to and from the straight-way valve. These tubular valve or gate seats, being detachable, can be readily taken out to be trued up on their inner ends or faces, against which the gates or valvular disks C C bear to close the passage through the straight-way valve. This will be found a great advantage which other straight-way valves do not possess. The gates C C are of circular form, with plain or flat exterior surfaces or faces where they come in contact with the inner ends of the seats B B, but with conical backs $c\ c$, and loosely fitting one within the other by a circular central stud or projection, $d$, on the back of one of them, arranged to enter a correspondingly-shaped central hole, $e$, in the body or rear of the other gate, so that although said gates are coupled together they are free to independently turn and rock or adjust themselves to the seats B B. This manner of connecting the independent gates not only provides for their being raised or lowered in concert to open or close the passage through the valve, but gives them freedom to perfectly seat themselves; also, by their ability to turn or revolve, to distribute the wear all around or over their surfaces of contact with the seats, which will prevent the formation of ridges as produced in other gates or valves having no such turning action.

D is a wedge having a slot, $f$, through it, within which the backs of the gates C C project. This slotted wedge is suitably connected above with a raising and lowering screw-stem, E, by which the valve is operated, said screw-stem working through a box or cap, F, on the body A. The slot $f$ in the wedge is oblong, and there is a convex or reversely-tapering form on its upper surface, (marked $g$,) and it should be chamfered off on its side edges to provide for a free rocking motion of the gates. The lower portion, $h$, of the slotted wedge serves to lift the gates C C when operating the stem E for the purpose.

Within the lower portion of the body A are beveled or sloping guide-ribs $k\ k$, for guiding the gates C C to their seats B B. These ribs are concentric with the openings in the seats B B, and incline downwardly toward said seats.

In the operation of the valve the gates C C do not slide or ride over the seats B B when worked down to be closed by the screw-stem E, but are simply brought opposite the openings in the seats and surfaces against which they are required to bear, and it is not until the upper portion, $g$, of the slotted wedge D presses upon the upper portions of the conical backs of the gates, which it may do at one or more points, and the lower portions of the gates bear on the sloping guide-ribs $k\ k$, that the gates are forced outward toward and against the seats B B. This does away with all grinding of the gates against their seats, which is a serious and common objection with most straight-way valves.

The gates C C can be removed when required, without disconnecting the valve from its pipes, by taking off the cap F; also, the conical construction of the backs of the gates C C provides for the passage of any obstruction getting in between them to the space *i* beneath, so that the gates are at full liberty to seat themselves.

A straight-way valve constructed as described essentially differs from others in which a screw-stem has connected with it toggle-levers that not only raise or lower opposite gates or valve-disks, but thrust the same outward against their seats; also from a slotted tubular valve provided with one or more inlets, and which is opened against the resistance of the fluid by a wedge-shaped key operated by a spindle.

The tubular devices B B, it will be observed, not only form externally-removable gate-seats, but also couplings for connecting the inlet and outlet pipes with the valve.

I am aware that it is not new to make straight-way valves, arrange them in a valve-box movable up and down by a screw, and to clamp them against their seats by an upper wedge on the valve-box and a bottom wedge on the body of the valve-chamber; but What I do claim as new and of my invention is—

The combination, with the valve-body A, of the slotted sliding wedge D, the side or end gates, C C, freely fitted thereto, and constructed with conical backs *c c*, the beveled guide-ribs *k k*, and the gate-seats B B, substantially as described.

BARTHOLOMEW J. KELLY.

Witnesses:
 DENNIS KELLY,
 MICHAEL J. KELLY.